(12) United States Patent
Nagai

(10) Patent No.: US 6,621,023 B2
(45) Date of Patent: Sep. 16, 2003

(54) WIRE CONNECTION STRUCTURE OF LAMP UNIT

(75) Inventor: Kentaro Nagai, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 34 days.

(21) Appl. No.: 10/050,110

(22) Filed: Jan. 18, 2002

(65) Prior Publication Data
US 2002/0096423 A1 Jul. 25, 2002

(30) Foreign Application Priority Data
Jan. 19, 2001 (JP) ..................... P2001-011879

(51) Int. Cl.[7] .................. B60Q 3/02
(52) U.S. Cl. ............ 200/292; 362/549; 439/456; 200/51 R
(58) Field of Search ............. 200/292, 293, 200/51 R, 51.11; 362/549, 40; 439/449, 456, 459, 470

(56) References Cited

U.S. PATENT DOCUMENTS 5,529,535 A * 6/1996 Forish .................. 439/56
5,590,948 A * 1/1997 Moreno .................. 362/494
6,467,937 B2 * 10/2002 Nagata et al. ............. 362/490
6,513,961 B2 * 2/2003 Nagai et al. .............. 362/549

FOREIGN PATENT DOCUMENTS

JP       6-79044    11/1994    .......... H01H/21/70

* cited by examiner

Primary Examiner—Michael Friedhofer
(74) Attorney, Agent, or Firm—Sughrue Mion, PLLC

(57) ABSTRACT

A lamp unit (21) for mounting in a lamp mounting window in an interior wall member includes a bulb (27), mounted on an insulating housing (25), a wire connecting conductor (29), having a wire connecting terminal portion (29) for connection to an FFC (28), installed on a vehicle body panel-side of the interior wall member, and a power supply-side bulb contact portion (29b) electrically connected to one electrode (27a) of the bulb (27), and a switch connecting conductor (33) having a switch contact portion, connected to a switch unit (31), and a grounding-side bulb contact portion (33a) electrically connected the other electrode (27b) of the bulb (27). The relative positional relation between the electrodes (27a, 27b) of the bulb (27) on the insulating housing (25) is so determined that the one electrode (27a) of the bulb (27) is disposed remote from the wire connecting terminal portion (29a).

6 Claims, 6 Drawing Sheets

PRIOR ART

WIRE CONNECTION STRUCTURE OF LAMP UNIT

BACKGROUND OF THE INVENTION

This invention relates to a wire connecting structure of a lamp unit mounted in a lamp mounting window formed in an interior wall member covering a vehicle body panel, and more particularly to an improvement for preventing characteristics of electrical connection between a wire connecting terminal portion and a wire from being degraded by the influence of heat generated by a bulb.

In the case of mounting a lamp unit, such as a room lamp and a courtesy lamp, on an interior wall member, such as a roof trim and a door trim, covering a vehicle body panel of a vehicle, the lamp unit has heretofore been mounted in a lamp mounting window formed in the interior wall member.

FIGS. 5 to 7 show a wire connecting structure of a related lamp unit disclosed in JP-A-6-79044U and others.

The lamp unit 1, shown in FIG. 5, is a room lamp unit for mounting on a ceiling portion of a vehicle room, and this lamp unit comprises an insulating housing 3 for mounting in a lamp mounting window in a roof trim, serving as an interior wall member of the ceiling portion, a generally-cylindrical bulb 5, having a pair of electrodes 5a and 5b provided respectively at its opposite ends, a wire connecting conductor 7, having a wire connecting terminal portion 7a for connection to a wire 6, installed on the roof trim, and a bulb contact 7b, electrically connected to one electrode 5a of the bulb 5, a switch unit 9 for switching an operating condition of the bulb 5, and a switch connecting conductor 11 electrically connecting the other electrode 5b of the bulb 5 to the switch unit 9.

As shown in FIG. 6, the bulb 5 is mounted on that side (upper surface in this Figure) of the insulating housing 3 facing the vehicle room, and a releasable cover lens 15 is mounted on this housing, and then this housing is mounted on the roof trim.

The switch unit 9 has a switch lever 16 pivotally supported on the insulating housing 3, and by pivotally moving this switch lever, a contact 16a, formed at a distal end of this switch lever, can be contacted with a selected one of mating conductors, thereby switching the operating condition of the bulb 5.

The wire connecting conductor 7 and the switch connecting conductor 11 are bus bars formed of an electrically-conductive metal sheet.

As shown in FIG. 7, the wire connecting terminal portion 7a of the wire connecting conductor 7 is in the form of a tongue-like tab terminal which can be fittingly connected to a female terminal of a connector 18 secured to a distal end of the wire 6.

In the above related lamp unit 1, the wire connecting portion, formed by the connector 18, is disposed as close to the one electrode 5a of the bulb 5 as possible so that the length of installation of the wire connecting conductor 7 can be reduced as much as possible, as shown in FIG. 7.

Therefore, in the lamp unit 1 in which the distance between the bulb 5 and the connector 18 is short, heat, generated when the bulb 5 is lighted, is liable to be transferred to the connector 18 through the wire connecting conductor 17, so that this connector 18 is liable to be affected by this heat. The terminal fitting portion of the connector 18 is subjected to stress relaxation due to the heat, and therefore there has been a fear that the pressure of contact between the terminals is lowered, so that the electrical resistance increases.

SUMMARY OF THE INVENTION

It is therefore an object of this invention to overcome the above problem, and more specifically to provide a wire connecting structure of a lamp unit in which a wire connection portion, at which a wire connecting terminal portion and a wire are connected together, is less liable to be affected by heat generated at the time of lighting of a bulb, thereby securing a connection reliability.

In order to solve the aforesaid object, the invention is characterized by having the following arrangement.

(1) A structure for connecting wire to a lamp unit mounted to a lamp mounting window formed in an interior wall member covering a vehicle body panel, the structure comprising:
   an insulating housing mounted to the lamp mounting window;
   a bulb which includes a first electrode and a second electrode and is attached to the insulating housing;
   a wire connecting conductor which includes a wire connecting terminal portion for connection to the wire installed on a vehicle body panel-side of the interior wall member, and a first bulb contact portion electrically connected to the first electrode; and
   a switch connecting conductor which includes a switch contact portion connected to a switch unit for switching an operating condition of the bulb, and a second bulb contact portion electrically connected to the second electrode,
   wherein relative positional relation between the first electrode and the second electrode is so determined that the first electrode is disposed remote from the wire connecting terminal portion so as to increase a radiating area extending between the wire connecting terminal portion and the first bulb contact portion.

(2) The structure according to (1), wherein the wire connecting conductor is constituted by a first conductor including the wire connecting terminal portion, and a second conductor which is separate from the first conductor and includes the first bulb contact portion.

(3) The structure according to (1), wherein the first bulb contact portion is a power supply-side bulb contact portion, and the second bulb contact portion is a grounding-side bulb contact portion.

(4) The structure according to (1), wherein length from the wire connecting terminal portion to the first bulb contact portion is longer than length from the first bulb to the second bulb.

(5) The structure according to (4), wherein a part of the wire connecting conductor extends along the bulb from the first electrode side toward the second electrode side.

(6) The structure according to (2), wherein the first conductor and the second conductor are made of materials different from each other.

In the above construction, the distance or spacing between the wire connecting terminal portion and the power supply-side bulb contact portion of the wire connecting conductor is increased, and by doing so, the radiating area between the wire connecting terminal portion and the power supply-side bulb contact portion is increased, and therefore the amount of radiation of heat from the conductor surface can be increased.

Therefore, heat, generated at the time of lighting of the bulb, is sufficiently radiated at the region extending from the power supply-side bulb contact portion to the wire connecting terminal portion, so that the heating of the wire connecting terminal portion, which is the connecting portion connected to the wire, is suppressed. Therefore, the reliability of the electrical connection of the wire connecting terminal portion is prevented from being decreased by stress relaxation and so on due to the heat.

The first conductor is made of an electrically-conductive material (for example, a copper alloy such as C2600) having excellent electrical conductivity and a suitable degree of ductility, and by doing so, a conductor of the wire can be positively connected to the wire connecting terminal portion even when this wire connecting terminal portion is formed by press-connecting blades, a piercing terminal or the like.

The second conductor is made of an electrically-conductive material (for example, stainless steel such as SUS301 and SUS304) which is hard, and has resilient properties, and by doing so, a proper load of contact of the power supply-side bulb contact portion with the electrode of the bulb can be secured, and therefore the bulb can be positively held against vibrations and an impact.

Therefore, with respect to the wire connecting conductor, by suitably selecting materials for the first conductor and the second conductor which meet different purposes and functions of the wire connecting terminal portion and the power supply-side bulb contact portion, and then by forming the assembly, the reliability of the wire connecting terminal portion and the reliability of the power supply-side bulb contact portion can be achieved at the same time.

DETAILED DESCRIPTION OF PREFERRED EMBODIMENTS

One preferred embodiment of a wire connecting structure of a lamp unit of the present invention will now be described in detail with reference to the accompanying drawings.

Figure 1:
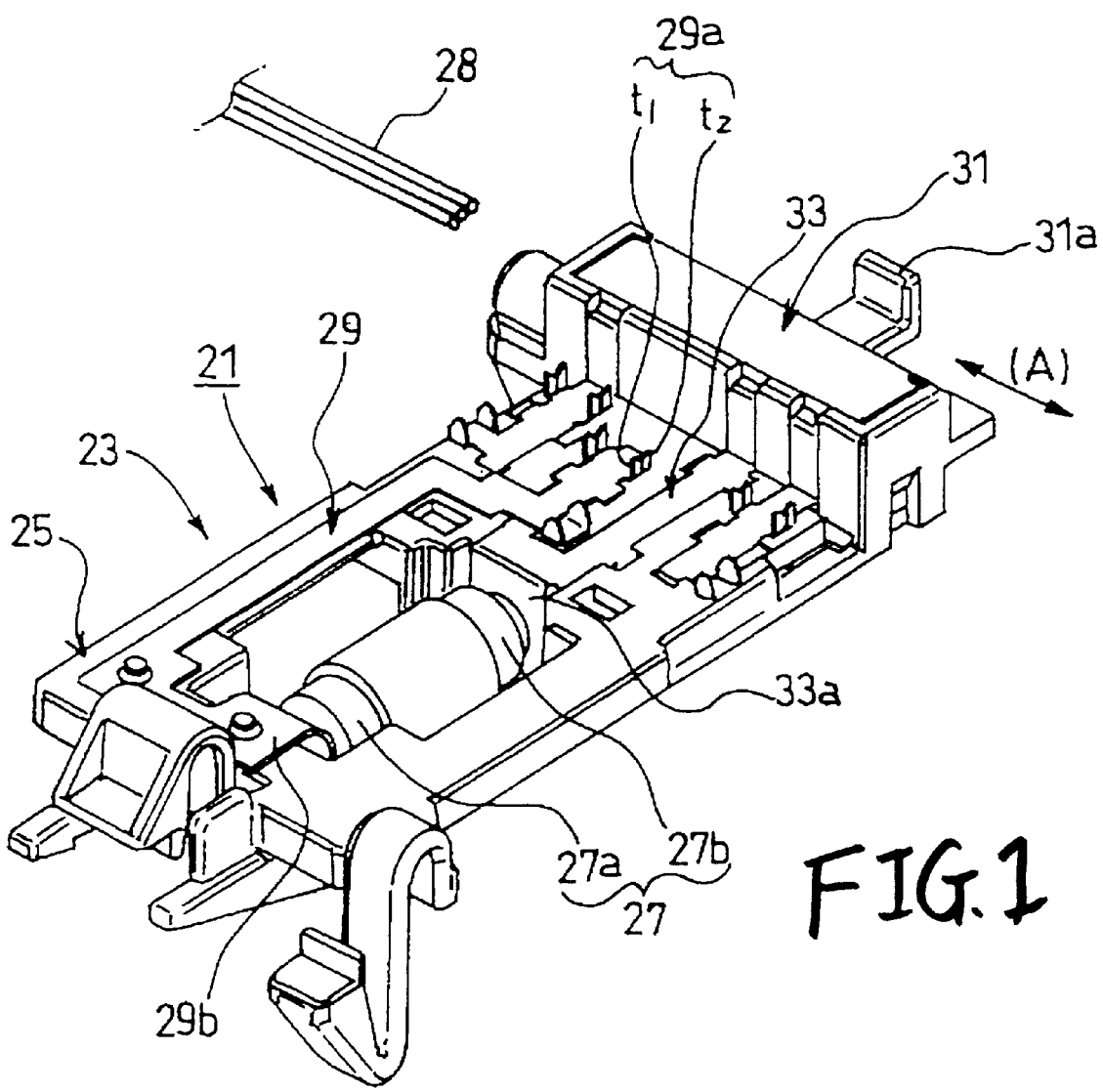
FIG. 1 is a perspective view explanatory of a first embodiment of a wire connecting structure of a lamp unit of the invention, showing a condition before wires are connected to this unit.
Figure 2:
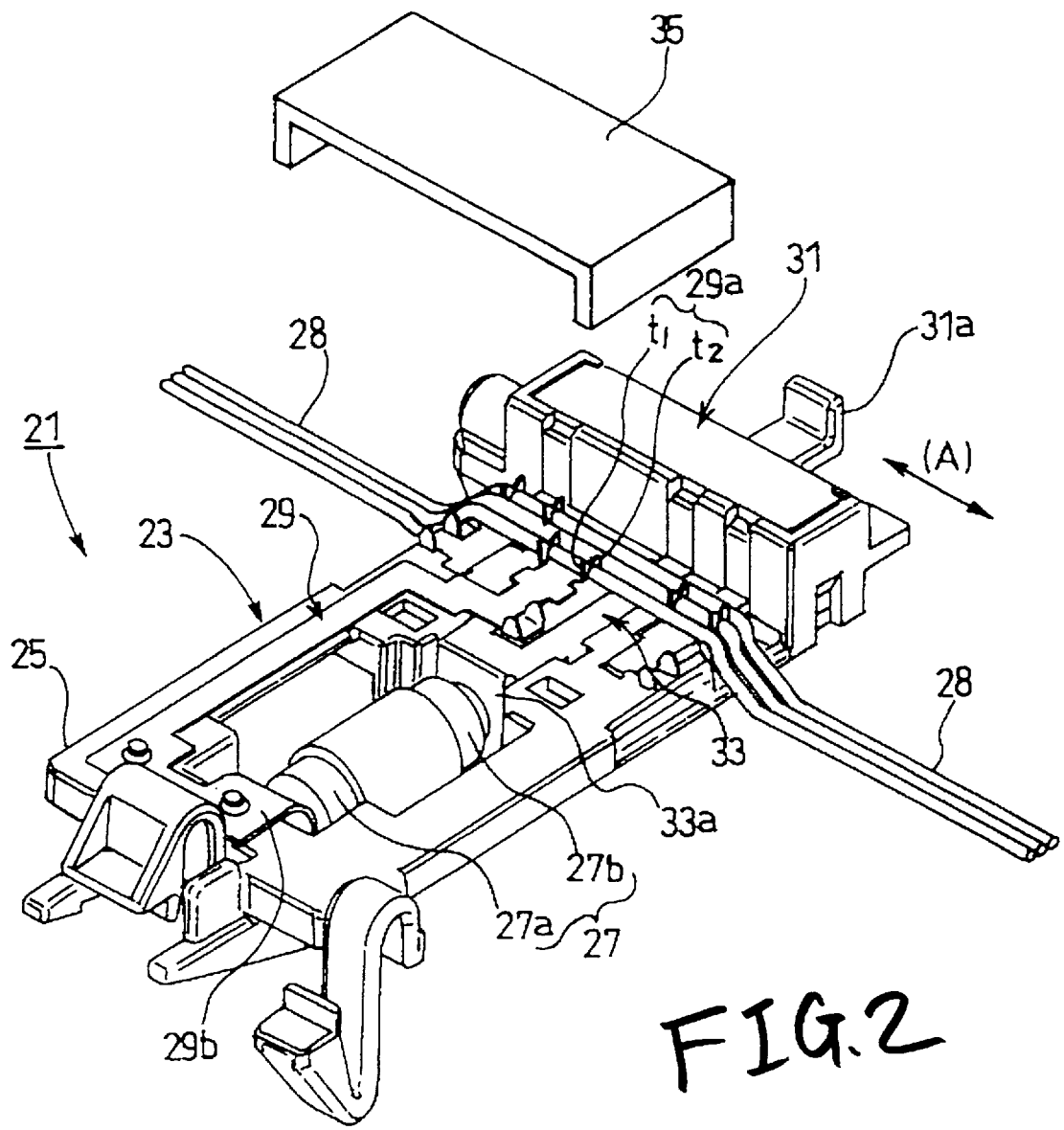
FIG. 2 is a perspective view of the lamp unit of FIG. 1, showing a condition after the wires are connected to this unit.

FIG. 1 is a perspective view explanatory of the first embodiment of the wire connecting structure of the lamp unit of the invention, showing a condition before wires are connected to this unit, and FIG. 2 is a perspective view of the lamp unit of FIG. 1, showing a condition after the wires are connected to this unit.

As shown in FIG. 1, the lamp unit 21 of this first embodiment is a room lamp unit for mounting on a ceiling portion of a vehicle room of a vehicle, and this lamp unit comprises a lamp function portion 23 for mounting in a lamp mounting window in a roof trim (serving as an interior wall member) covering the ceiling portion formed by a vehicle body panel, and a cover lens (not shown) which serves as a design portion, and covers that portion of this lamp function portion 23 exposed to the vehicle room.

The cover lens, serving as the design portion, has a retaining structure which can be attached to and detached from the lamp function portion 23. An FFC (flexible flat cable) 28, which comprises wires, and is installed on the ceiling portion, is electrically connected to the lamp function portion 23, and the lamp function portion 23 is mounted in the lamp mounting window, and thereafter the cover lens is attached to cover that side of the lamp function portion 23 facing the vehicle room.

The lamp function portion 23 comprises a bulb 27, attached to an insulating housing 25 adapted to be mounted in the lamp mounting window in the roof trim, a wire connecting conductor 29, having a wire connecting terminal portion 29a for connection to the FFC 28, installed on the ceiling side of the roof trim, and a power supply-side bulb contact portion 29b, electrically connected to one electrode 27a of the bulb 27, and a switch connecting conductor 33 having a switch contact portion (not shown), electrically connected to a connection terminal in a switch unit 31 for switching an operating condition of the bulb 27, and a grounding-side bulb contact portion 33a electrically connected to the other electrode 27b of the bulb 27.

In this embodiment, the FFC 28, serving as wires, comprises a plurality of round conductors which are integrally combined together into a flattened, band-like cable by an insulative covering material.

The wire connecting conductor 29 and the switch connecting conductor 33 are bus bars formed of an electrically-conductive metal sheet. The wire connecting terminal portion 29a of the wire connecting conductor 29 has a press-connecting terminal wire structure in which each pair of press-connecting blades t1 and t2 for press-connection to the corresponding round conductor of the FFC 28 are formed by stamping and bending.

The press-connecting portions of the FFC 28, press-connected respectively to the wire connecting terminal portion 29a of the wire connecting conductor 29 and wire connecting terminal portions of other bus bars, forming a switching circuit, are covered with a strain relief cover 35, and are fixed by this cover.

The switch unit 31 is a so-called slide-type switch means, and by moving a switch lever 31a which is supported for sliding movement in a direction of arrow (A), a contact on a distal end of this switch lever 31a is brought into contact with a selected one of the conductors, thereby switching the operating condition of the bulb 27.

In the lamp function portion 23 of the lamp unit 21 of this embodiment, the relative positional relation between the one electrode 27a and the other electrode 27b of the bulb 27 on the insulating housing 25 is so determined that the one electrode 27a of the bulb 27 is disposed remote from the wire connecting terminal portion 29a. By thus determining the relative positional relation between the one electrode 27a and the other electrode 27b of the bulb 27 on the insulating housing 25, a radiating area, extending between the wire connecting terminal portion 29a and the power supply-side bulb contact portion 29b of the wire connecting conductor 29 is increased.

Namely, in the lamp unit 21 of this first embodiment, the distance or spacing between the wire connecting terminal portion 29a and the power supply-side bulb contact portion 29b of the wire connecting conductor 29 is increased, and by doing so, the radiating area between the wire connecting terminal portion 29a and the power supply-side bulb contact portion 29b is increased, and therefore the amount of radiation of heat from the conductor surface can be increased.

Heat, generated at the time of lighting of the bulb 27, is sufficiently radiated at the region extending from the power supply-side bulb contact portion 29b to the wire connecting terminal portion 29a, so that the heating of the wire connecting terminal portion 29a, which is the connecting portion connected to the FFC 28, is suppressed.

Therefore, the press-connecting force of the press-connecting blades t1 and t2 is prevented from being decreased by stress relaxation and so on due to the heat, and therefore the reliability of the electrical connection is prevented from being lowered, so that the stable electrical connection characteristics can be maintained.

Figure 3:
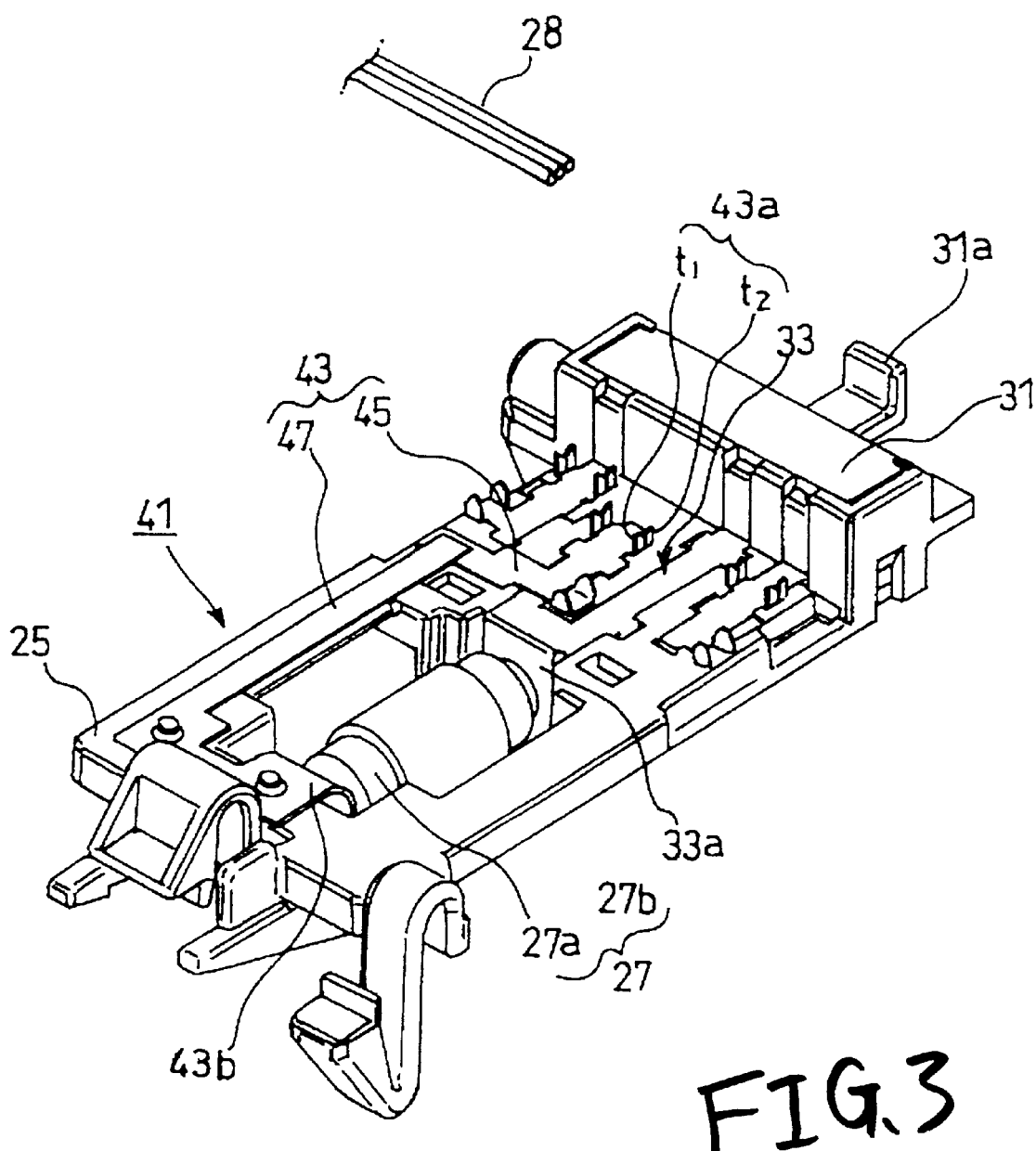
FIG. 3 is a perspective view explanatory of a second embodiment of a wire connecting structure of a lamp unit of the invention, showing a condition before wires are connected to this unit.
Figure 4:
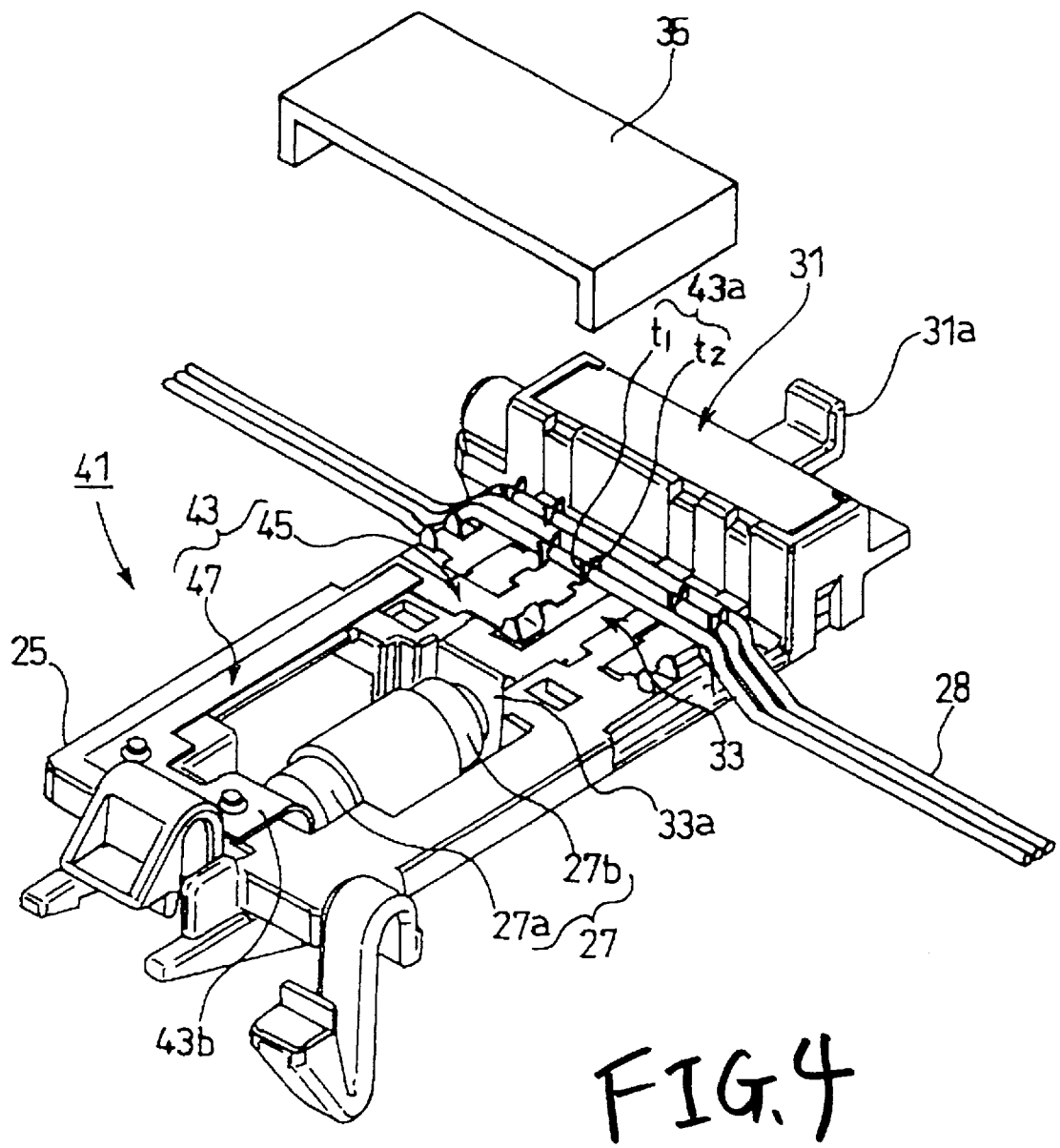
FIG. 4 is a perspective view of the lamp unit of FIG. 3, showing a condition after the wires are connected to this unit.
Figure 5:
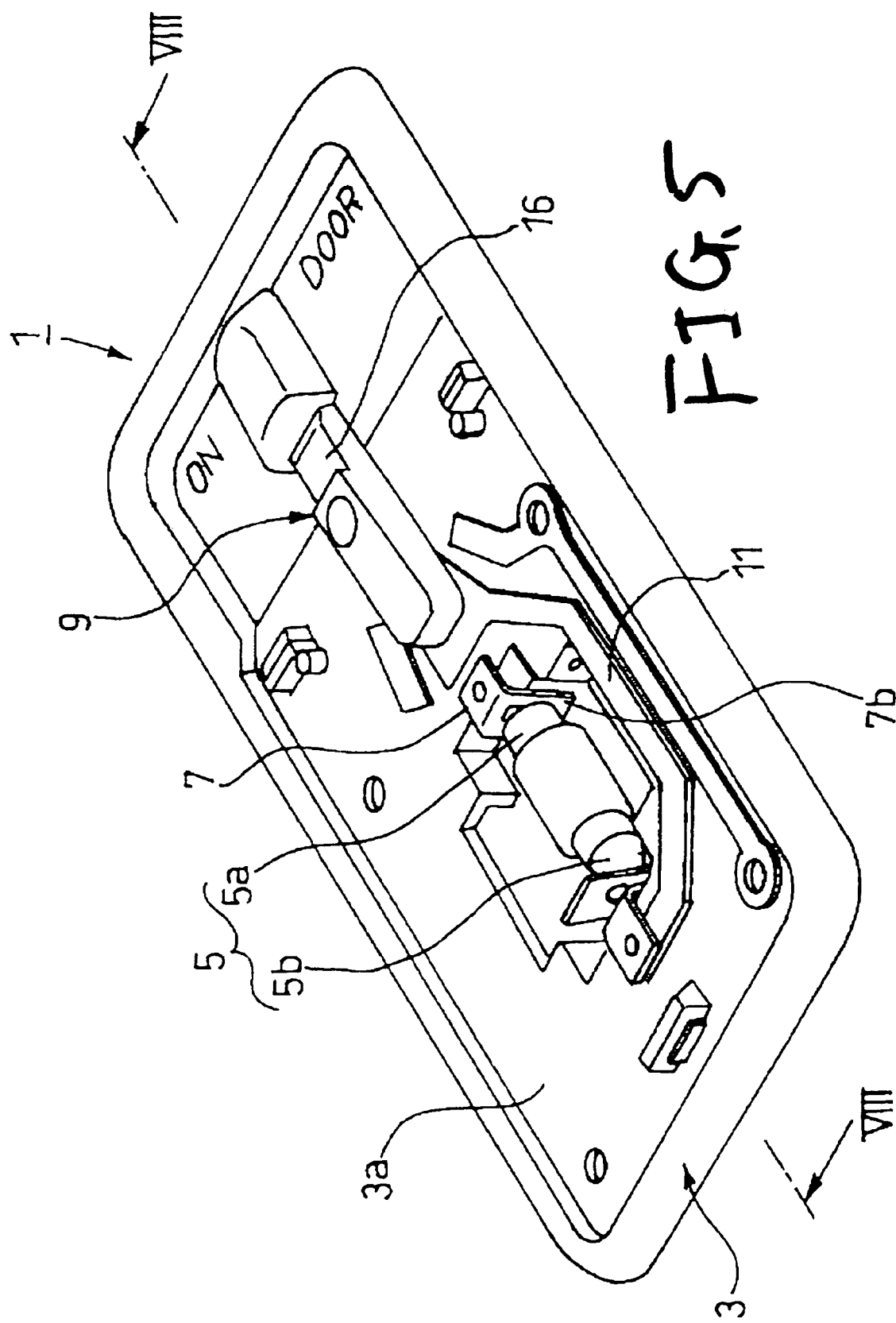
FIG. 5 is a perspective view explanatory of a wire connecting structure of a related lamp unit.
Figure 6:
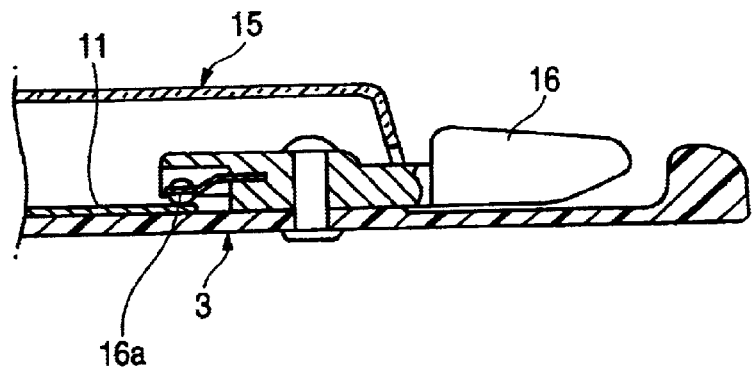
FIG. 6 is an enlarged, cross-sectional view of a portion of the lamp unit of FIG. 5.
Figure 7:
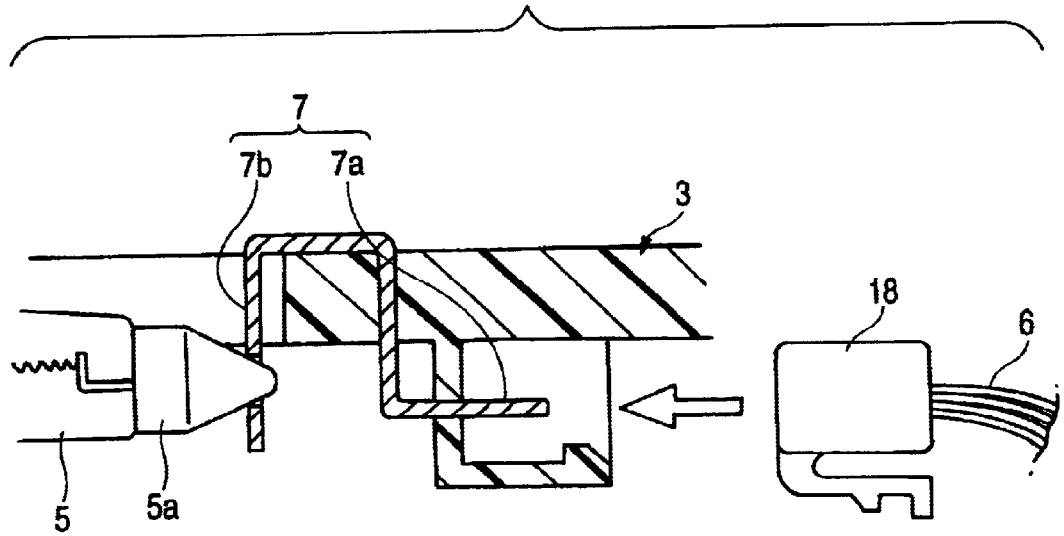
FIG. 7 is a cross-sectional view of an important portion of the wire connecting structure of the lamp unit of FIG. 5.

FIG. 3 is a perspective view explanatory of a second embodiment of a wire connecting structure of a lamp unit of the invention, showing a condition before wires are connected to this unit, and FIG. 4 is a perspective view of the lamp unit of FIG. 3, showing a condition after the wires are connected to this unit.

In the lamp unit 41 of this second embodiment, instead of the wire connecting conductor 29 of the lamp function portion 23 of the above first embodiment, a wire connecting conductor 43 is used. This lamp unit 41 is similar in construction to the lamp unit 21 of the first embodiment except the construction of the wire connecting conductor 43, and therefore detailed description will be omitted while using identical reference numerals.

Unlike the wire connecting conductor 29 of the first embodiment in which the wire connecting terminal portion 29a and the power supply-side bulb contact portion 29b are formed into the integral construction, using the same material, the wire connecting conductor 43 of this second embodiment comprises an assembly comprising a first conductor 45, having a wire connecting terminal portion 43a for connection to the FFC 28, and a second conductor 47 which is separate from the first conductor 45, and has a power supply-side bulb contact portion 43b electrically connected to the one electrode 27a of the bulb 27.

Connecting portions of the first and second conductors 45 and 47 to be connected together are electrically connected together, for example, by a structure in which an engagement projection, formed by bending at an end portion of the second conductor 47, is press-fitted into a retaining hole formed in an end portion of the first conductor 45. The first conductor 45 and the second conductor 47 can be connected together by spot welding, soldering or the like.

Namely, in the lamp unit 41 of this second embodiment, the first conductor 45 of the wire connecting conductor 43 is made of an electrically-conductive material (for example, a copper alloy such as C2600) having excellent electrical conductivity and a suitable degree of ductility, and by doing so, there can be avoided a disadvantage that press-connecting blades t1 and t2 of the wire connecting terminal portion 43a are excessively pressed by the conductor of the FFC 28, and cut this conductor. Therefore, the conductor of the FFC 28 can be positively connected to the wire connecting conductor 43.

On the other hand, the second conductor 47 of the wire connecting conductor 43 is made of an electrically-conductive material (for example, stainless steel such as SUS301 and SUS304) which is hard, and has resilient properties, and by doing so, a proper load of contact of the power supply-side bulb contact portion 43b with the electrode 27b of the bulb 27 can be secured, and therefore the bulb 27 can be positively held on the insulating housing 25 against vibrations and an impact.

Therefore, with respect to the wire connecting conductor 43, by suitably selecting materials for the first conductor 45 and the second conductor 47 which meet different purposes and functions of the wire connecting terminal portion 43a and the power supply-side bulb contact portion 43b, and then by forming the assembly, the reliability of the wire connecting terminal portion 43a and there liability of the power supply-side bulb contact portion 43b can be achieved at the same time.

The insulating housing, the bulb, the wire, the wire connecting conductor, the switch unit, the switch connecting conductor and so on of the wire connecting structure of the lamp units of the present invention are not limited to their respective constructions of the above embodiments, but can take various forms on the basis of the subject matter of the invention.

For example, the wires, installed on the interior wall member, are not limited to the FFC of the above embodiments, and a flat circuit member, such as an FPC (flexible printed circuit board) and a ribbon cable, a wire harness or others can be used.

In the above embodiments, the room lamp, serving as the lamp unit, is mounted on the roof trim serving as the interior wall member, the invention can be applied also to a map lamp, mounted on the roof trim, and other lamp unit, such as a courtesy lamp mounted on a door trim serving as an interior wall member covering a door panel (vehicle body panel).

The wire connecting terminal portion of the wire connecting conductor is not limited to the press-connecting terminal structure of the above embodiments, but can adopt other connecting means such as a piercing terminal structure and a soldering structure.

In the above wire connection structures of the lamp unit of the invention, the distance or spacing between the wire connecting terminal portion and the power supply-side bulb contact portion of the wire connecting conductor is increased, and by doing so, the radiating area between the wire connecting terminal portion and the power supply-side bulb contact portion is increased, and therefore the amount of radiation of heat from the conductor surface can be increased.

Therefore, heat, generated at the time of lighting of the bulb, is sufficiently radiated at the region extending from the power supply-side bulb contact portion to the wire connecting terminal portion, so that the heating of the wire connecting terminal portion, which is the connecting portion connected to the wire, is suppressed. Therefore, the reliability of the electrical connection of the wire connecting terminal portion is prevented from being decreased by stress relaxation and so on due to the heat.

Therefore, there can be provided the wire connecting structure of the lamp unit in which the wire connection portion, at which the wire connecting terminal portion and the wire are connected together, is less liable to be affected by heat generated at the time of lighting of the bulb, thereby securing the connection reliability.

What is claimed is:

1. A structure for connecting a wire to a lamp unit mounted to a lamp mounting window formed through an interior wall member covering a vehicle body panel, the structure comprising:

an insulating housing mounted to the lamp mounting window;

a bulb which includes a first electrode and a second electrode and is attached to the insulating housing;

a wire connecting conductor which includes a wire connecting terminal portion for connection to the wire installed on a vehicle body panel-side of the interior wall member, and a first bulb contact portion electrically connected to the first electrode; and a switch connecting conductor which includes a switch contact portion connected to a switch unit for switching an operating condition of the bulb, and a second bulb contact portion electrically connected to the second electrode, wherein a relative positional relation between the first electrode and the second electrode is so determined that the first electrode is disposed remote from the wire connecting terminal portion so as to increase a radiating area extending between the wire connecting terminal portion and the first bulb contact portion.

2. The structure according to claim 1, wherein the wire connecting conductor is constituted by a first conductor including the wire connecting terminal portion, and a second conductor which is separate from the first conductor and includes the first bulb contact portion.

3. The structure according to claim 2, wherein the first conductor and the second conductor are made of materials different from each other.

4. The structure according to claim 1, wherein the first bulb contact portion is a power supply-side bulb contact portion, and the second bulb contact portion is a grounding-side bulb contact portion.

5. The structure according to claim 1, wherein a length from the wire connecting terminal portion to the first bulb contact portion is longer than a length from the first bulb to the second bulb contact.

6. The structure according to claim 5, wherein a part of the wire connecting conductor extends along the bulb from the first electrode side toward the second electrode side.

* * * * *